(12) United States Patent  
Manning et al.

(10) Patent No.: US 6,899,466 B2  
(45) Date of Patent: May 31, 2005

(54) METHOD OF DETERMINING LIKELIHOOD OF OPTICAL FIBER CONNECTOR MAKING POSITIVE CONTACT

(75) Inventors: Randy Marshall Manning, Lemoyne, PA (US); Michael Lawrence Gurreri, York, PA (US); John Baker Breedis, Boston, MA (US)

(73) Assignee: Tyco Electronics Corporation, Middleton, PA (US)

( * ) Notice: Subject to any disclaimer, the term of this patent is extended or adjusted under 35 U.S.C. 154(b) by 197 days.

(21) Appl. No.: 10/112,696

(22) Filed: Mar. 28, 2002

(65) Prior Publication Data

US 2002/0191918 A1 Dec. 19, 2002

Related U.S. Application Data

(60) Provisional application No. 60/279,540, filed on Mar. 28, 2001.

(51) Int. Cl.$^7$ .............................................. G02B 6/36
(52) U.S. Cl. ........................................ 385/78; 385/147
(58) Field of Search .............................. 385/53–87, 147

(56) References Cited

PUBLICATIONS

"Generic Requirements for Singlemode Optical Connectors and Jumper Assemblies", Telcordia Technologies, GR–326–Core, Issue 3, Sep. 1999, pp.: cover and 4–43 to 4–48.*

* cited by examiner

*Primary Examiner*—John D. Lee

(57) ABSTRACT

A method of qualifying a ferrule assembly as being adequate to make physical contact upon mating, the method comprising approving the ferrule assembly if an undercut of the ferrule assembly does not exceed a maximum allowable undercut based on ferrule deformation at a particular compressive load and apex offset.

16 Claims, 9 Drawing Sheets

θ = 0° – Apexes in phase

θ = 180° – Apexes out of phase

METHOD OF DETERMINING LIKELIHOOD OF OPTICAL FIBER CONNECTOR MAKING POSITIVE CONTACT

REFERENCE TO RELATED CASE

This application claims priority under 35 U.S.C. §119(e) to Provisional Application No. 60/279,540, filed on Mar. 28, 2001, which is hereby incorporated by reference in its entirety, including its appendices.

FIELD OF INVENTION

This invention relates generally to an approach for inspecting and qualifying optical connectors, and, more specifically, to an approach for determining whether ferrules of optical connectors have adequate end-face geometry to effect physical contact.

BACKGROUND OF INVENTION

Optical fiber connectors are an essential part of substantially any optical fiber communication system. For instance, such connectors are used to join segments of fiber into longer lengths, to connect fiber to active devices such as radiation sources, detectors and repeaters, and to connect fiber to passive devices, such as switches, multiplexers, and attenuators.

A typical optical fiber connector comprises a housing and a ferrule assembly within the housing. The ferrule assembly comprises a ferrule, which has one or more bore holes to accommodate fibers, and a fiber secured in each bore hole such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with optical pathway of the mating structure. This way, light from the fiber is opitcally coupled to the optical pathway.

It is well known that to effect an optical coupling and minimize Fresnel loss, there must be sufficient "physical contact" between the fiber and the optical path of the mating structure. Generally, adequate physical contact requires that an area of the fiber core contacts the optical path. In common optical applications, this area is at least 62.5 $\mu$m, although it should be understood that the area of physical contact will be a function of a system's tolerance to Fresnel loss. For purposes of illustration, however, throughout this disclosure, we will assume a requisite physical contact of 62.5 $\mu$m.

There are many factors that affect a connector's ability to make adequate physical contact when mated. Applicants submit that these factors are generally related to (1) the geometry of the end-face of the ferrule, (2) the compressive force of the mated connectors, (3) the ferrule material, and (4) the environmental response. These features are herein referred to as the "PC connector interface parameters" or "PC parameters" for short.

Referring to FIG. 1, the key geometric parameters of fiber undercut, radius of curvature, and apex offset are shown. Fiber undercut is a measure of the fiber's recess within the ferrule and is the distance from the fiber end to the ferrule end face. Radius of curvature is a measure of curve of the ferrule's end face. And apex offset is a measure of the fiber core's offset from the apex of the ferrule end face and is the distance from the centerline of the bore hole in the ferrule to the apex of the ferrule end face. These are well known parameters.

With respect to compressive force parameters, different connectors have different mated forces. The term "mated force" refers to the force applied to the ferrule end face when the connector is mated. This force is typically imparted on the ferrule by virtue of a spring which urges the ferrule away from the connector such that the ferrule end face urges against the mating structure. A standard connector typically has a 2.5 mm diameter ferrule and has a mated force ranging from about 0.5 to about 0.9 kg, while a small form factor (SFF) connector typically has a 1.25 mm diameter ferrule and a mated force ranging from about 0.3 to about 0.5 kg.

With respect to ferrule material, the parameters of interest are Young's modulus and Poisson's ratio. Throughout this application, a zirconia ferrule material is considered in detail, however, it should be understood that the present invention is not limited to this particular material or to the Young's modulus and Poisson's ratio associated with this material.

Environmental response is yet another PC parameter that may affect physical contact. Although many such environmental conditions exist, of particular interest herein is the coefficient of thermal expansion mismatch between the fiber and the ferrule material. Additionally, there is potentially a permanent fiber withdrawal due to the creep of the adhesive used to fasten the fiber to the ferrule.

Traditional approaches for assessing whether a connector is likely to make adequate physical contact involve allowable ranges of the end face radius of curvature, apex offset, and fiber undercut as independent parameters for a given constant force. If the undercut of a particular ferrule is above the maximum allowable undercut, then the ferrule is determined to lack the proper geometric parameters to effect adequate physical contact. Although this approach is a simple and effective way of determining whether adequate physical contact will be made, applicants have found that it is overly exclusive and thereby lowers yields considerably. In particular, this approach ignores the interactions between not only the geometric parameters, but also the other PC parameters described above.

A more recent approach determines allowable undercut as a function of end face radius of curvature with a specific allowable maximum apex offset at a given contact force. (See, GR-326-CORE, Issue 3, (Sept. 1999) *Genetic Requirements for Singlemode Optical Connectors and Jumper Assemblies*, (herein "GR-326-CORE, Issue 3"), incorporated herein by reference). This method determines what the maximum undercut can be based upon the radius of curvature and a fixed constant value representing the maximum apex offset (i.e., 50 $\mu$m). Although this more recent approach acknowledges the interaction of radius of curvature and allowable undercut, and, in so doing, is less restrictive than the prior art approach, applicants believe that it is still overly exclusive and therefore unnecessarily limits yields.

Therefore, a need exists for an approach that determines whether a connector will make adequate physical contact that is not overly exclusive. The present invention fulfills this need among others.

SUMMARY OF INVENTION

The present invention provides an approach for determining whether a connector will make adequate physical contact based upon the interaction of the PC connector interface parameters, rather than on independent ranges of each parameter. More specifically, it had been found that PC parameters often compensate for one another so that a particular PC parameter which is outside a specified range may not result in the connector making inadequate physical contact if another PC parameter compensates for it. Of particular interest in the present invention is the interaction of the fiber undercut, ferrule deformation, and apex offset and their interrelationship with respect to the ferrule's radius of curvature. For example, a larger-radius ferrule is more difficult to deform than a smaller-radius ferrule and, thus, is less forgiving of undercut. However, it is also less affected by apex offset. In a preferred embodiment, the approach of the present invention also takes into consideration the interaction of environmental conditions such as temperature and creep on the likelihood of a connector making physical contact.

One aspect of the invention is a method of qualifying a ferrule assembly as being adequate to make physical contact upon mating based on the interaction of the various PC parameters. In a preferred embodiment, the method comprises approving the ferrule assembly if an undercut of the ferrule assembly does not exceed a maximum allowable undercut based on ferrule deformation at a particular compressive load and apex offset. As mentioned above, applicants have found that allowable undercut, ferrule deformation and apex offset are interrelated by the ferrule's radius of curvature. In a preferred embodiment, the interrelationship of maximum allowable undercut, ferrule deformation and apex offset is represented by the following equation:

$$u(R,\delta) = C \cdot R^\beta - R + \sqrt{R^2 - \delta^2}$$

where,
- u=maximum allowable fiber undercut
- R=end face radius of curvature
- C=a constant related to compressive force
- $\beta$=constant related to a given ferrule material
- $\delta$=apex offset from fiber center Another aspect of the intention is a lot of approved terminated connector assemblies comprising a plurality of connectors, each connector having a ferrule assembly containing one or more fibers, wherein one or more ferrule assemblies of the lot do not meet the GR326-Core, Issue 3 specification, but do have an undercut which does not exceed a maximum allowable undercut based on ferrule deformation at a particular compressive load and apex offset.

Yet another aspect of the invention is an apparatus for determining whether a ferrule assembly is suitable for making physical contact when mated based on the interaction of the various PC parameters. In a preferred embodiment, the apparatus is configured to approve the ferrule assembly if an undercut of the ferrule assembly does not exceed a maximum allowable undercut based on ferrule deformation at a particular compressive load and apex offset.

DETAILED DESCRIPTION

Figure 1:
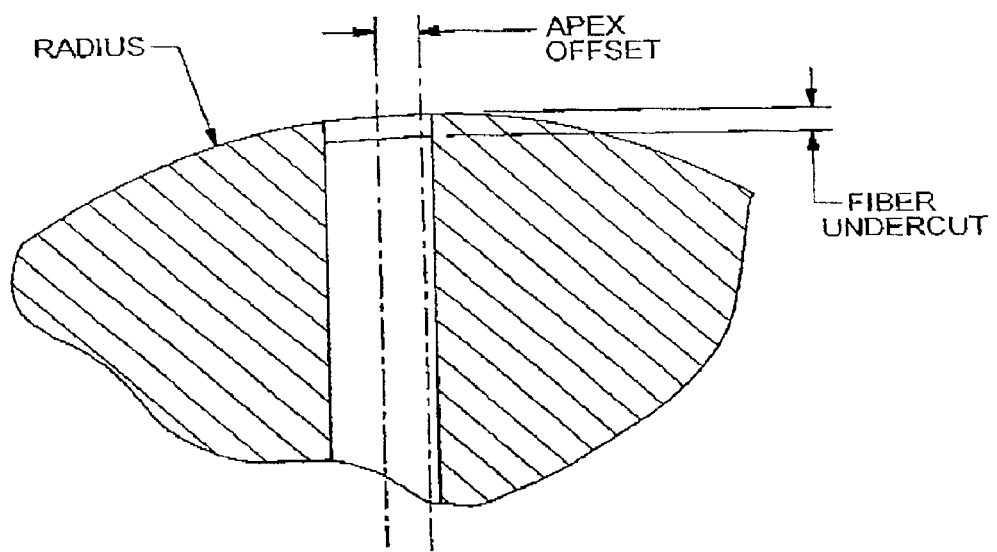
FIG. 1 shows a cross section of a fiber containing ferrule and the geometric PC connector interface parameters of radius, apex offset, and fiber undercut.

The present invention provides an approach for determining if physical contact is likely to occur between a ferrule and the optical path of a mating structure. This approach involves the interaction of various PC parameters such as end face geometric data, material physical properties data, and anticipated environmental conditions such as temperature.

The present invention acknowledges that allowable undercut, ferrule deformation and apex offset are related to each other in terms of radius of curvature. For example, it is recognized that while a larger radius may decrease a ferrules ability to deform and, therefore, reduce the allowable undercut, it also tends to mitigate apex offset. Therefore, by relating these ferrule features to one another, a more accurate model for determining if physical contact is likely to occur between a ferrule assembly containing a fiber and an optical path of a mating structure. The interplay among undercut, apex offset, and fiber deformation with respect to radius of curvature is considered in more detail below.

Applicants recognize that allowable undercut varies as a function of deformation. Deformation, in turn, is a function of radius of curvature of the ferrule, the compressibility of the ferrule material, and the compressive force. For a symmetrical contact model, the allowable undercut is defined by the following equation:

$$u(R) = C \cdot R^\beta \qquad \text{Equation (1)}$$

where,
- u=allowable fiber undercut,
- R=radius of curvature,
- $\beta$=a constant related to a given ferrule material, and
- C=a constant related to compressive force.

Constants C and $\beta$ can be calculated using known techniques. One such technique involves using finite element analysis to model a ferrule assembly and calculate its response to certain variable changes, e.g., compressive load changes. Using a linear transform (e.g., linear regression), these responses can then be used to determine C and $\beta$. For example, using finite element analysis, a zirconia ferrule was modeled and various compressive forces were applied to achieve adequate physical contact which is assumed herein to be when the spherical fiber end flattens to a 62.5 $\mu$m diameter surface. The results of this experiment are provided in Table 1 below.

TABLE 1

| Compressive Force (kg) | Equation Constants C | β | $100 \cdot r^2$ (%) |
|---|---|---|---|
| 0.9 | 1902 | −0.715 | 99.97 |
| 0.7 | 1758 | −0.715 | 99.99 |
| 0.5 | 1607 | −0.715 | 99.95 |
| 0.3 | 1382 | −0.715 | 99.99 |

A regression analysis shows that Equation 1 agrees with the data. For example given a mated force of 0.5 kg to the zirconium ferrule, Equation 1 becomes $u(R)=1607 \times R^{-0.715}$.

The qualification approach of the present invention preferably relates allowable undercut and ferrule deformation with apex offset. Again, the applicants have found that allowable undercut and apex offset are interrelated by radius of curvature. Specifically, the reduction in allowable undercut as a function of apex offset maybe be represented as follows:

$$s(R) = R - \sqrt{R^2 - \delta^2} \qquad \text{Equation (2)}$$

where,
s=reduction in allowable undercut, and
δ=apex offset.

Modifying Equation (1) to reduce the allowable undercut due to apex offset as represented by Equation (2), we arrive at the following equation for maximum undercut based on ferrule deformation and apex offset:

$$u(R,\delta) = C \cdot R^\beta - R + \sqrt{R^2 - \delta^2} \qquad \text{Equation (3)}$$

It should be understood that Equation 3, the maximum allowable undercut equation, is not limited to symmetric ferrule couplings. If a particular ferrule assembly complies with Equation 3, then it can be mated with another ferrule having a different radius of curvature, providing that the other ferrule also complies with the Equation 3. Indeed, the situation of mating two ferrules having the same radius of curvature is the worst-case scenario-if a particular ferrule is mated with a ferrule having a larger radius of curvature, then the maximum allowable undercut for the particular ferrule would actually be higher than that allowed under Equation 3. Furthermore, it should be understood that the equations for maximum undercut apply when the ferrule is mated to an optical path having a flat surface, i.e., a surface with an infinite radius of curvature.

It is worthwhile to mention that the maximum allowable undercut equation also represents the worst case scenario with respect to the apex offset of one ferrule relative to its mating ferrule. In other words, this equation ignores the potential that the apex offsets of the mating ferrules may be complimentary and therefore compensate for one another. Indeed, for a given radius and apex offset, the necessary undercut compensation of one ferrule has a sinusoidal variation with respect to its radial alignment with the mating ferrule. This variation is illustrated with respect to FIGS. 3, 4, and 5. Before addressing this variation, however, one must have an understanding of a ferrule's apex offset radial orientation with respect to that of its mating ferrule.

Figure 2A:
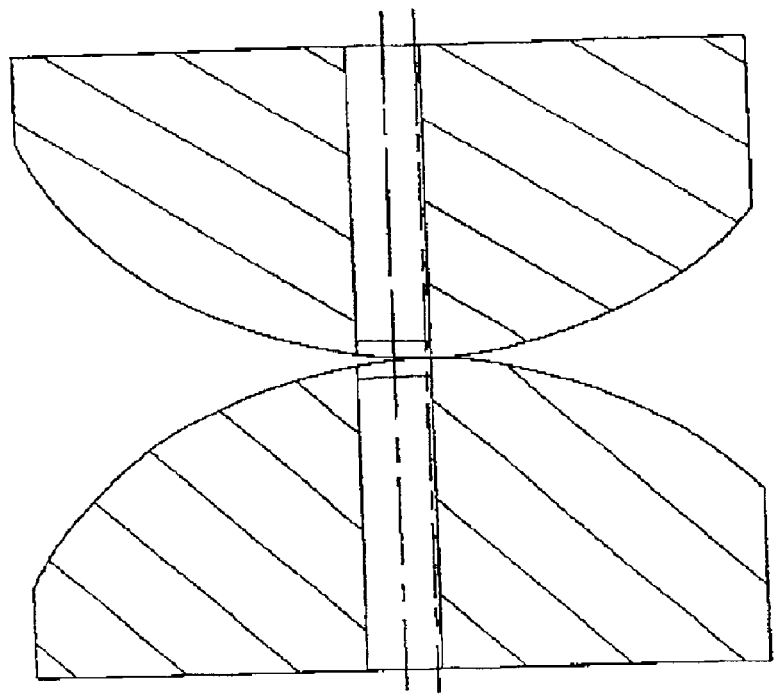
FIGS. 2a and 2b show cross sectional views of mating ferrules in which the apex offsets are in phase and out of phase, respectively.
Figure 2B:
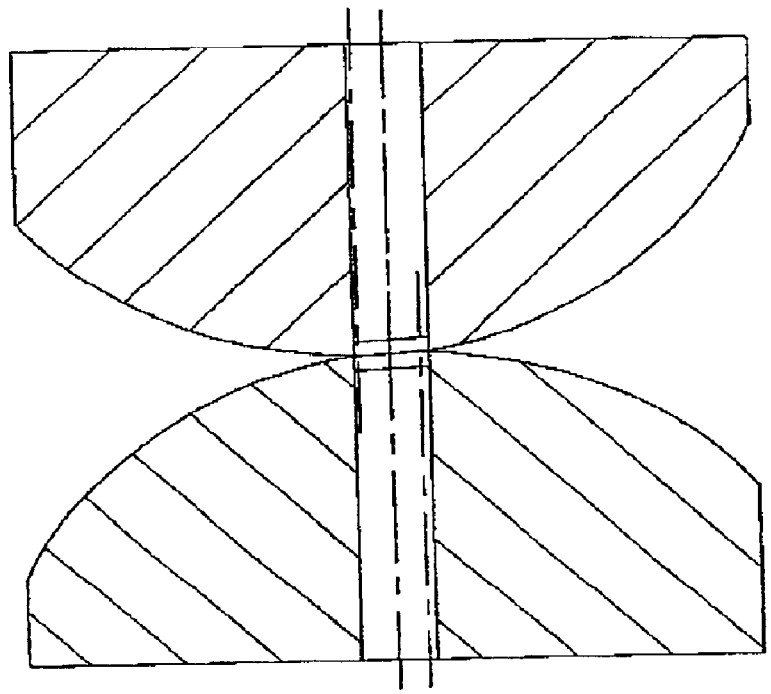

Referring to FIGS. 2a and 2b, the orientation of apex offsets are shown. Since an apex offset will necessarily create an asymmetrical ferrule, the asymmetrical ferrule necessarily will have a radial orientation in space. This radial orientation relative to another ferrule having an apex offset is designated herein as θ. In FIG. 2a, the apex offsets are in phase, i.e., θ is equal to 0. In FIG. 2b, the apex offsets are out of phase, i.e., θ is equal to 180°. When the apex offsets are in phase, (i.e., θ=0), maximum undercut compensation is needed. This is the worst-case scenario and is expressed in Equation 3. When the apex offsets are out of phase (i.e., θ=180°), no adjustment is needed.

Figure 3:
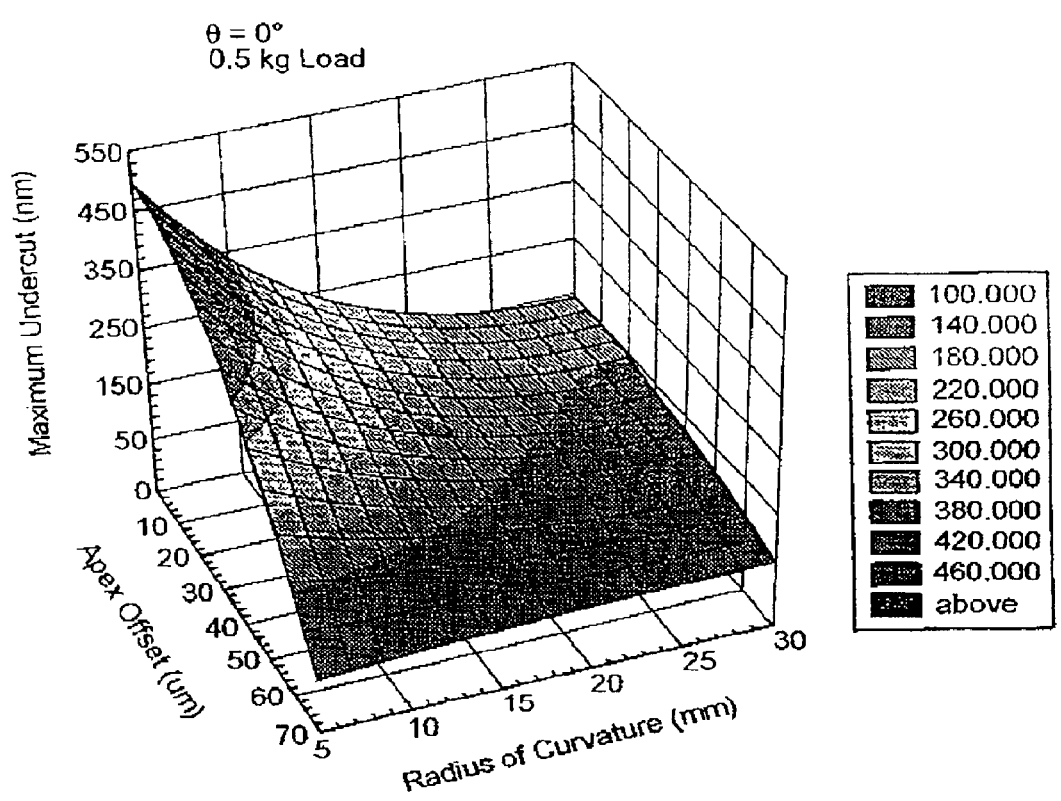
FIG. 3 shows a three-dimensional graph in which the plotted surface represents the maximum undercut as a function of apex offset and radius of curvature for a 0.5 kg compressive mating force when the apex offsets which are in phase.
Figure 4:
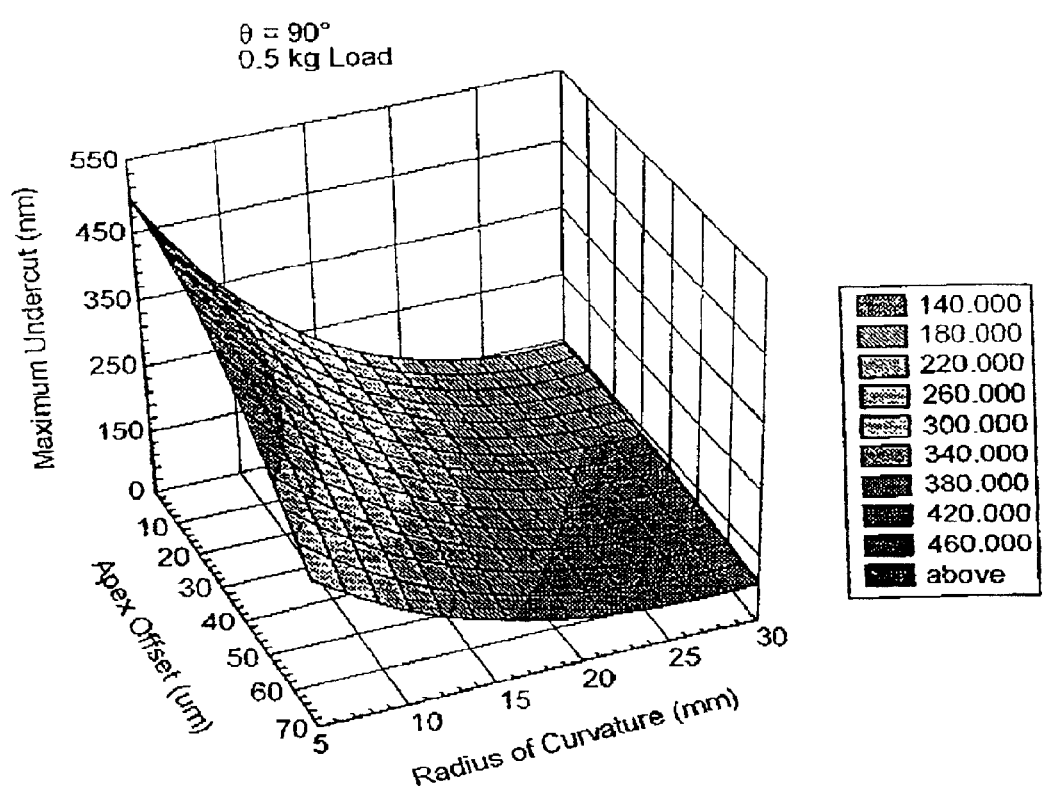
FIG. 4 shows the same surface as FIG. 3 but for apex offsets which are 90° out of phase.
Figure 5:
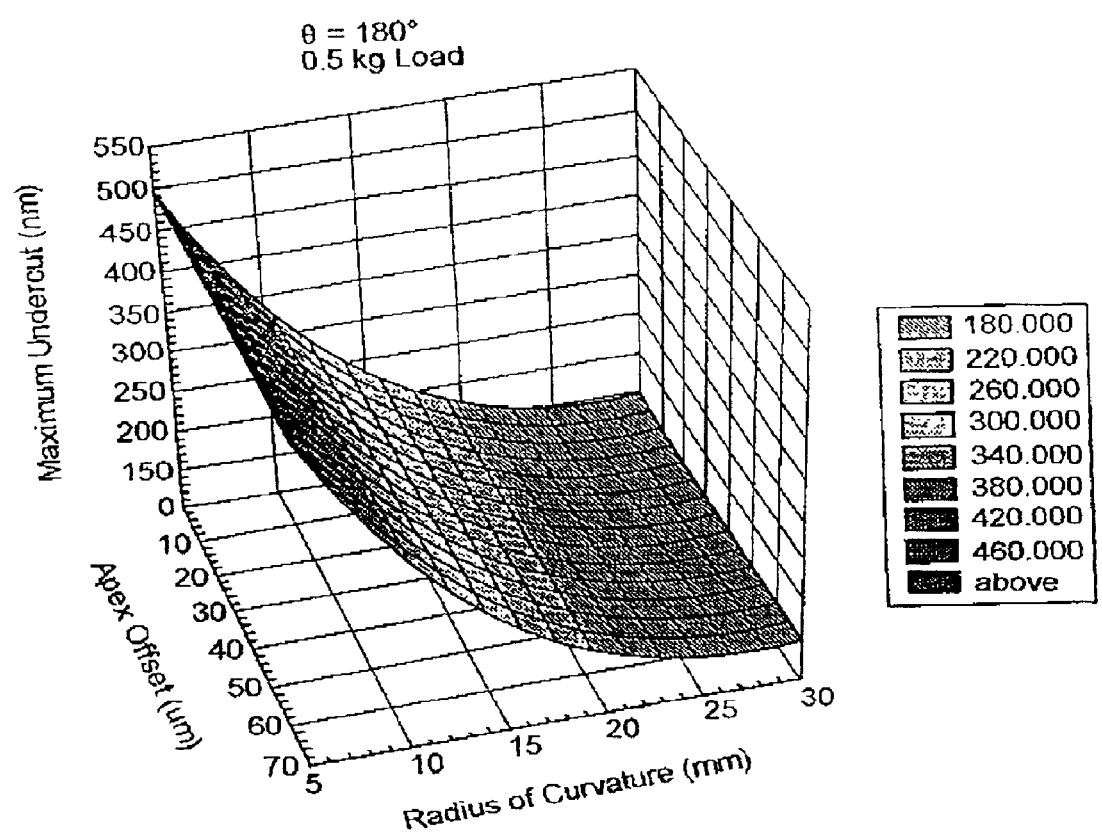
FIG. 5 shows the same graph as FIG. 3 except for apex offsets which are 180° out of phase.

FIGS. 3, 4, and 5 each show a plotted surface for maximum undercut as a function of apex offset and radius of curvature. In FIG. 3, θ is equal to 0 and it is interesting to note that as the apex offset increases ferrules having a smaller radius of curvature are affected far more detrimentally than those having a larger radius of curvature. FIG. 4 shows the plotted surface for maximum undercut when θ is equal to 90, in other words, when the apex offsets are half out of phase. It is interesting to note that again, as the apex offset increases, those ferrules with a smaller radius of curvature are affected more detrimentally than those having a larger radius of curvature but not to the extent as when θ is equal to 0. FIG. 5 shows the plotted surface of maximum undercut as a function of apex offset and radius of curvature when θ is equal to 180°, that is, when the apex offsets are completely out of phase. Here, it is interesting to note that the apex offset has very little if any detectable affect on the maximum undercut regardless of the radius of curvature of the ferrule.

In addition to ferrule deformation and apex offset, differences in thermal expansion between the fiber and the ferrule may also diminish the allowable undercut. Thermal expansion may be represented by the following equation:

$$\Delta u = -\alpha \cdot \Delta T \qquad \text{Equation (4)}$$

where,
Δu=equals reduction allowable fiber undercut,
α=differential coefficient of thermal expansion which is material dependant, and
ΔT=temperature difference.

Figure 6:
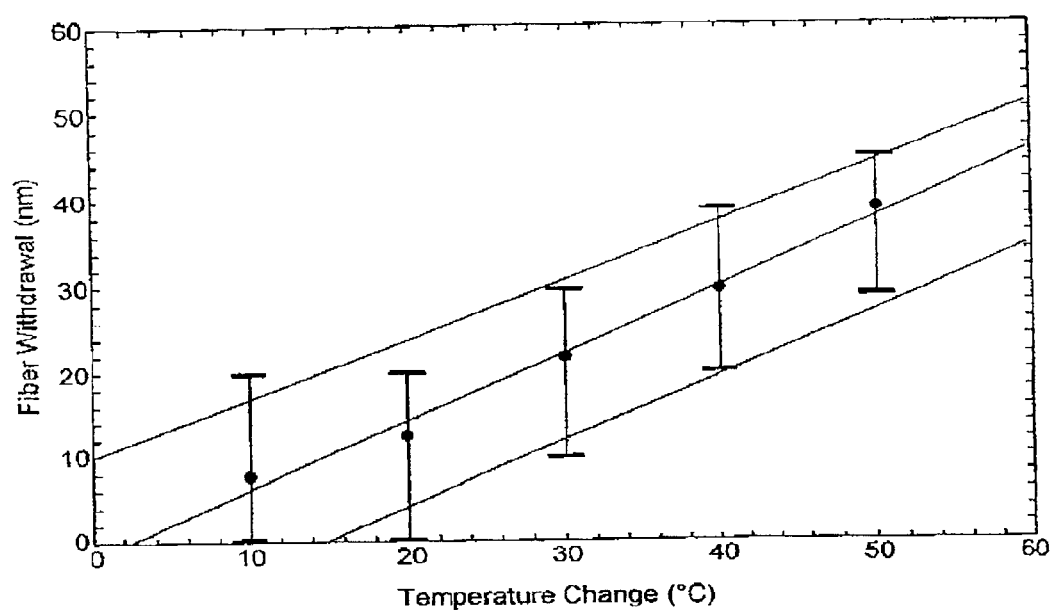
FIG. 6 shows the effects of temperature change on fiber withdrawal.

Referring to FIG. 6, fiber withdrawal is a function of temperature as shown. This graph makes it clear that, as the temperature changes, the amount of fiber withdrawal increases linearly. For example, if a worse case estimate is taken for a temperature differential of 60° C., the maximal allowable undercut must be reduced by approximately 50 μm. In a more preferred embodiment, Equation 3 is combined with Equation 4 to arrive at the following equation for maximum allowable undercut:

$$u(R,\delta) = C \cdot R^\beta - R + \sqrt{R^2 - \delta^2} - \alpha \cdot \Delta T \qquad \text{Equation (5).}$$

Applicants also recognize that the maximum allowable undercut needs to be reduced by some factor k to account for the permanent fiber withdrawal due to adhesive creep. In its simplest form, creep strain may be represented by an Arrhenius equation where the strain is dependant on the applied stress material properties and environmental factors in time. However, molecular chain engagement in cross-linking and shape memory tend to complicate such a simple equation. Therefore to account for variability, physical testing provides the most accurate method of characterizing permanent fiber withdrawal. The characterization of permanent fiber withdrawal is designated herein as constant factor k. The constant factor k may be eliminated where mechanical attachment is used and there is no significant creep. Substituting the empirical value k for the Arrhenius equation and combining it with Equation (5), we arrive at the following closed form equation:

$$u(R,\delta,k) = C \cdot R^\beta - R + \sqrt{R^2 - \delta^2} - \alpha \cdot \Delta T - k \qquad \text{Equation (6).}$$

Equation 6 serves to integrate the various PC interface parameters such as radius, allowable undercut, apex offset, coefficients of thermal expansion, and the deformable constants C and β to arrive at a model which accounts for their interaction. It should be understood that, although Equation 6 is preferred, it may be truncated to simplify the model. Specifically, just Equation 3 may be used to account for only the interaction of undercut, apex offset and deformation. Such a truncated equation may be preferred especially if there is no significant creep and severe temperature changes are not anticipated.

Figure 7:
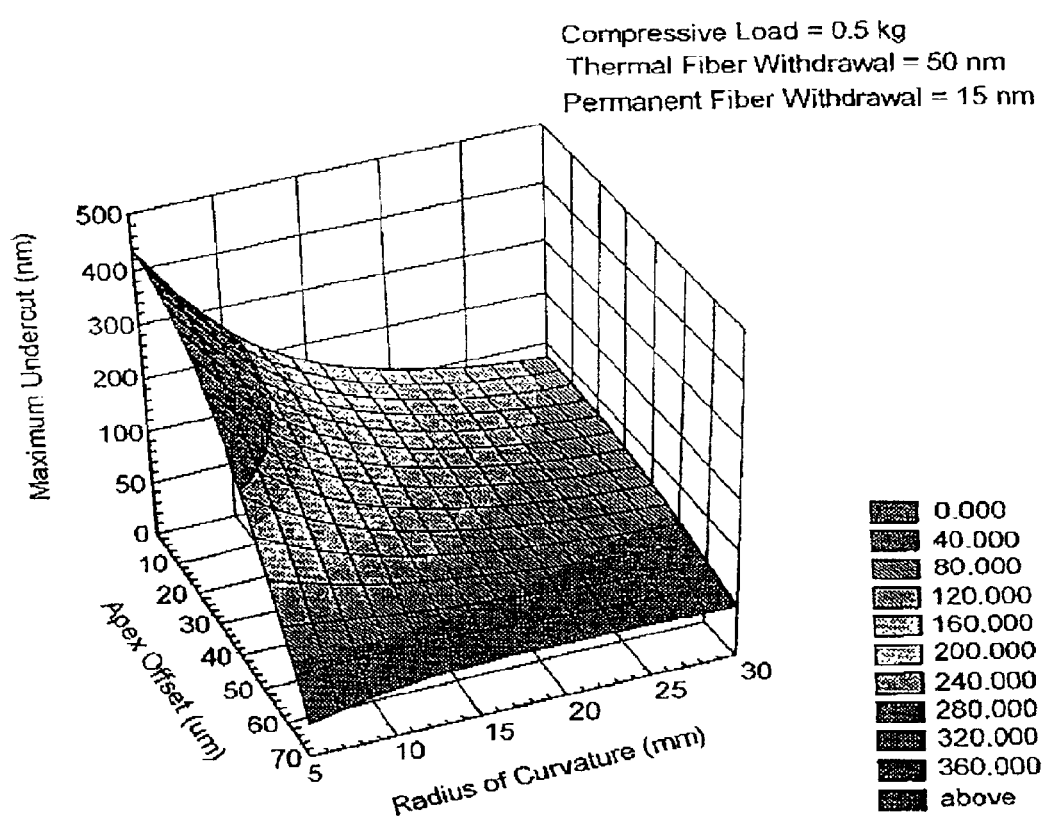
FIG. 7 shows the same graph as FIG. 3 but with the interaction of thermal fiber withdrawal of 15 nanometers and permanent fiber withdrawal of 15 nanometers.
Figure 8:
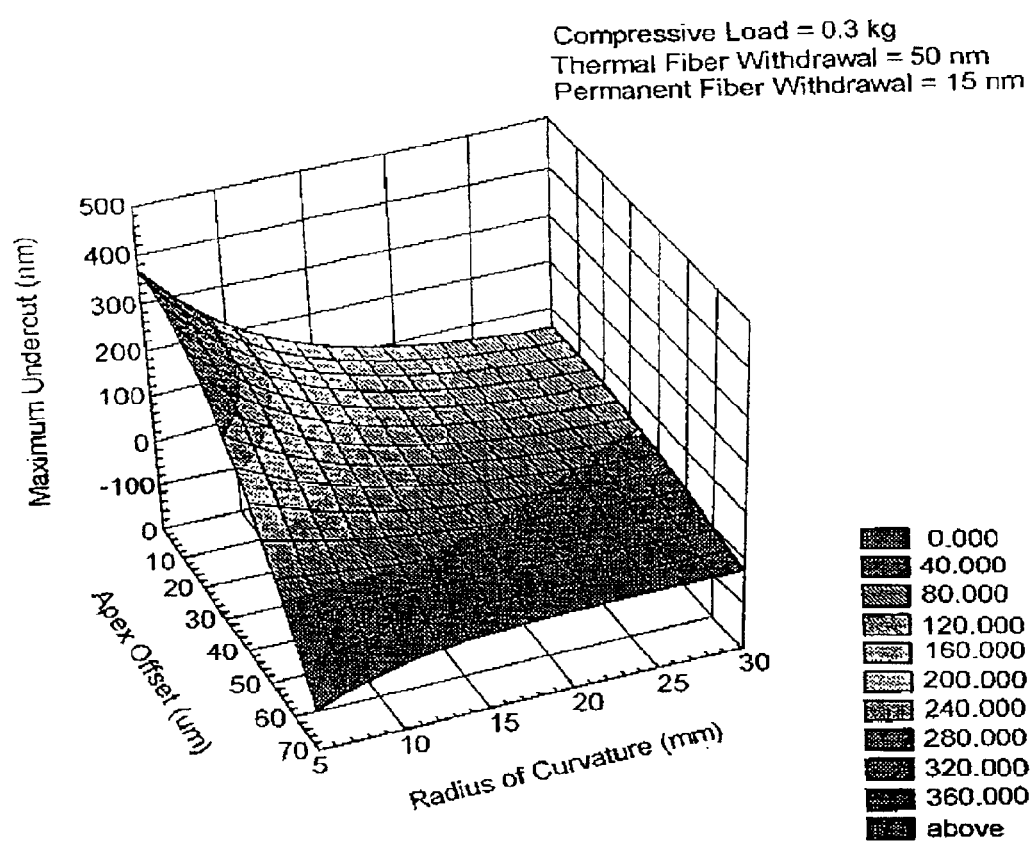
FIG. 8 shows the same graph as in FIG. 7 except the compressive load is 0.3 kg.

Referring to FIGS. 7 and 8, the plotted surface for maximum undercut as a function of apex offset and radius of curvature is provided for thermal fiber withdrawal of 50 nanometers and permanent fiber withdrawal of 15 nanometers. In FIG. 7, the plotted surface is a function of a 0.5 kg compressive load, while in FIG. 8, the plotted surface is a function of a 0.3 kg compressive load.

Figure 9:
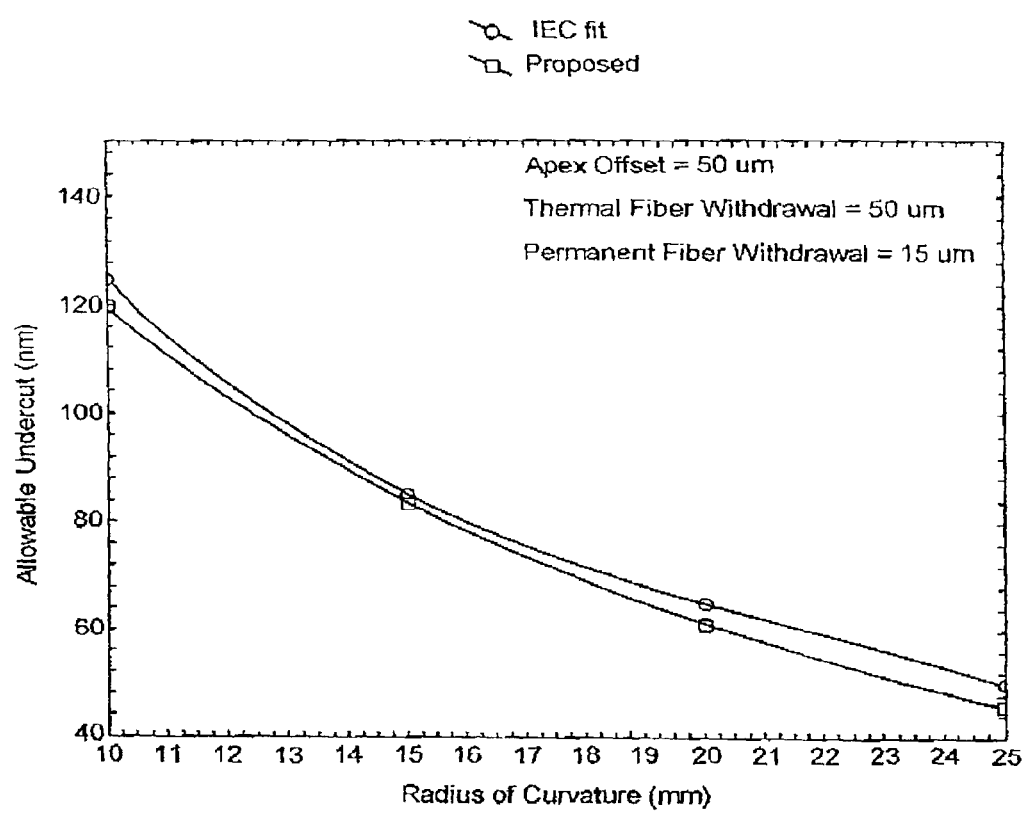
FIG. 9 shows a comparison the PC determination approach of the present invention and that of a standard polynomial fit.

Referring to FIG. 9, a comparison between the PC determination approach of the present invention and that of a standard polynomial fit is shown. As the graph elucidates, the approach of the present invention, which takes into consideration the interaction of the various PC parameters, is lower than that of the IEC fit which is based on the GR-326-CORE, Issue 3 specification. The maximum allowable undercut is particularly lower at the extremes of the radius of curvature. Such a result is not unexpected since the interaction of ferrule deformation and apex offset are both functions of radius of curvature. The IEC fit does not vary apex offset as a function of radius, and, thus, ignores the positive compensating effect apex offset has toward extremes of radius of curvature.

The qualification method of the present invention may be performed by testing and qualification apparatus. Specifically, the apparatus may be configured or programmed to determine if an undercut of a ferrule assembly exceeds the maximum allowable undercut in accordance with the present invention. This apparatus may be a specially-configured ferrule inspection device such as a non-contact interferometer, or a stand-alone computer which may or may not be interfaced with a ferrule inspection device to receive certain PC parameters therefrom, e.g., radius of curvature, offset, and undercut. Such testing equipment and calculating equipment are well known in the art and their configuration to perform the method of the present invention would be well within the purview of someone skilled in the art in light of this disclosure.

By determining the likelihood of physical contact of optical connectors using the approach of the present invention, it is anticipated that yields of terminated connectors will increase substantially. Furthermore, it is anticipated that shipments of terminated ferrules and/or connector assemblies will contain a portion of undercut ferrules which would have been considered previously unacceptable under the GR-326-CORE, Issue 3 specification, but which are acceptable using the qualification approach of the present invention. The portion of ferrule assemblies not meeting the GR-326-CORE, Issue 3 specification will vary depending on manufacturing and polishing techniques, although it is expected that the portion will range from about 5% to about 75% of the lot.

What is claimed is:

1. A method of qualifying a ferrule assembly as being adequate to make physical contact upon mating, said ferrule assembly comprising a ferrule having an end face and at least one fiber in said ferrule, said method comprising:

measuring the following parameters of said ferrule assembly;

fiber undercut;
    radius of curvature of said end face; and
    apex offset from the center of said fiber in said ferrule assembly;

qualifying said ferrule assembly if said fiber undercut is less than said maximum fiber undercut, said maximum fiber undercut complying with the following equation:

$$u(R,\delta)=C\cdot R^\beta-R+\sqrt{R^2-\delta^2}$$

where, u=said maximum fiber undercut,

R=said end face radius of curvature,

C=a constant related to compressive force,

β=a constant related to a given ferrule material, and

δ=said apex offset.

2. The method of claim 1, wherein maximum allowable undercut is also based on differences in thermal expansion between said fiber and said ferrule.

3. The method of claim 2, wherein maximum allowable undercut is represented by the following equation:

$$u(R,\delta)=C\cdot R^\beta-R+\sqrt{R^2-\delta^2}-\alpha\cdot\Delta T$$

where,

α=differential coefficient of thermal expansion which is material dependant, and ΔT=temperature difference.

4. The method of claim 3, wherein maximum allowable undercut is a function of creep.

5. The method of claim 4, wherein maximum allowable undercut is represent by the following equation:

$$u(R,\delta,k)=C\cdot R^\beta-R+\sqrt{R^2-\delta^2}-\alpha\cdot\Delta T-k$$

where, u=maximum allowable fiber undercut,

R=end face radius of curvature,

β=a constant related to ferrule material,

C=a constant related to compressive force,

δ=apex offset from fiber center,

α=differential coefficient of thermal expansion,

ΔT=upper application temperature, and k=permanent fiber withdrawal.

6. The method of claim 1, wherein said ferrule assembly is approved even if it does not meet the GR326-Core, Issue 3 specification.

7. The method of claim 6, wherein a ferrule assembly having a radius of curvature greater than 30 mm is approved.

8. The method of claim 6, wherein a ferrule assembly having an apex offset greater than 50 μm is approved.

9. A lot of approved terminated connector assemblies comprising:

a plurality of connectors, each connector having a ferrule assembly containing one or more fibers, one or more ferrule assemblies of said lot being outside standards set forth in GR326-Core, Issue 3 specification, but having an undercut that does not exceed a maximum allowable undercut wherein said maximum allowable undercut is represented by the following equation $$u(R,\delta)=C\cdot R^\beta-R+\sqrt{R^2-\delta^2}$$

where, u=maximum allowable fiber undercut,

R=end face radius of curvature,

C=a constant related to compressive force,

β=constant related to a given ferrule material, and

δ=apex offset from fiber center.

10. The lot of claim 9, wherein maximum allowable undercut is represented by the following equation:

$$u(R,\delta)=C \cdot R^{\beta}-R+\sqrt{R^2-\delta^2}-\alpha \cdot \Delta T-k$$

where,

α=differential coefficient of thermal expansion which is material dependant, and ΔT=temperature difference.

11. The lot of claim 9, wherein said one or more ferrule assemblies have a radius of curvature greater than 30 mm.

12. The lot of claim 9, wherein one or more ferrule assemblies have an apex offset greater than 50 μm.

13. An apparatus for determining whether a ferrule assembly is qualified for making physical contact when mated, said ferrule assembly comprising a ferrule having an end face and at least one fiber in said ferrule, said apparatus being configured to perform the following steps:

obtaining the following parameters of said ferrule assembly:

fiber undercut;

radius of curvature of said end face; and apex offset from the center of said fiber in said ferrule assembly; and qualifying said ferrule assembly if said fiber undercut is less than said maximum fiber undercut, said maximum fiber undercut complying with the following equation:

$$u(R,\delta)=C \cdot R^{\beta}-R+\sqrt{R^2-\delta^2}$$

where, u=said maximum fiber undercut,

R=said end face radius of curvature,

C=a constant related to compressive force,

β=a constant related to a given ferrule material, and

δ=said apex offset.

14. The apparatus of claim 13, wherein said apparatus is a non-contact inter ferometer, and the step of obtaining the parameters of said ferrule assembly comprises measuring said parameters.

15. The apparatus of claim 13, wherein said apparatus is a stand-alone computer in which said parameters are inputted.

16. The apparatus of claim 15, wherein said apparatus is interfaced with a non-contact interferometer and receives said parameters therefrom.

* * * * *